United States Patent [19]

Hanada et al.

[11] Patent Number: 5,178,716

[45] Date of Patent: Jan. 12, 1993

[54] PNEUMATIC RADIAL TIRE FOR PASSENGER VEHICLE WITH SPECIFIED CARCASS PROFILE

[75] Inventors: Ryoji Hanada, Isehara; Masaki Noro, Hiratsuka; Yukimasa Minami, Hiratsuka; Motohide Takasugi, Hiratsuka, all of Japan

[73] Assignee: The Yokohama Rubber Co., Tokyo, Japan

[21] Appl. No.: 622,570

[22] Filed: Dec. 5, 1990

[30] Foreign Application Priority Data

Dec. 19, 1989 [JP] Japan .................. 1-327421

[51] Int. Cl.$^5$ .......................... B60C 3/00; B60C 3/04
[52] U.S. Cl. ...................... 152/454; 152/538
[58] Field of Search ............... 152/454, 538

[56] References Cited

U.S. PATENT DOCUMENTS

| | | | |
|---|---|---|---|
| 4,527,606 | 7/1985 | Kita et al. | 152/454 X |
| 4,932,452 | 6/1990 | Kawabata et al. | 152/454 |
| 4,947,915 | 8/1990 | Panikkar et al. | 152/538 |

OTHER PUBLICATIONS

"Bohn, Zur Statik und Dynamik des Gurtelreifens", pp. 255–261 ATZ 69 (1967) 8.

*Primary Examiner*—Michael W. Ball
*Assistant Examiner*—Adrienne C. Johnstone
*Attorney, Agent, or Firm*—Nikaido, Marmelstein, Murray & Oram

[57] ABSTRACT

A pneumatic radial tire for a passenger vehicle, characterized in that at least a portion of a carcass line extending radially outwardly from the maximum width position in a carcass line of a tire fitted to a normal rim and inflated up to its normal internal pressure is configured so as to substantially conform to an equilibrium carcass line expressed by the following equations (1) and (2) calculated by using an internal pressure allotment ratio g(y) of a carcass layer at the tread portion that is obtained by setting the distributional configuration index α of the following equation (3) at 4 or more, and that the width of the belt layer extending radially outwardly of the tire is made to range from 105 to 120% of the ground-contacting width of the tread portion when loaded with a designed normal load, wherein:

in $y_D \leq y \leq y_A$, $$r_1 = \frac{\int_{y_D}^{y_A} g(y) \cdot y\, dy + (y_D{}^2 - y_C{}^2)/2}{g(y) \cdot y} \quad (1)$$

in $y_B \leq y \leq y_D$, $$r_1 = \frac{\int_{y_D}^{y_A} g(y) \cdot y\, dy + (y_D{}^2 - y_C{}^2)/2}{y} \quad (2)$$

$$g(y) = \frac{1 - \eta}{(y_D - y_A)^\alpha} (y - y_A)^\alpha + \eta \quad (3)$$

wherein, provided that a line drawn vertically downwardly from the center of the tread portion to the axle of the tire is y axis of coordinates with the axle of the tire being z axis of coordinates, yA, yD, yC, yB and η denote as follows:

yA: y axis of coordinates for the carcass line at the center of the tread portion;

yD: y axis of coordinates for the carcass line at the effective width end portion of the belt layer;

yC: y axis of coordinates for the carcass line at the maximum width position in a tire carcass line;

yB: y axis of coordinates for the carcass line at the bead portion; and

η: the internal pressure allotment ratio of the carcass layer at the center of the tread portion.

4 Claims, 3 Drawing Sheets

PNEUMATIC RADIAL TIRE FOR PASSENGER VEHICLE WITH SPECIFIED CARCASS PROFILE

BACKGROUND OF THE INVENTION

The present invention relates to a pneumatic radial tire (hereinafter referred to as a radial tire) for a passenger vehicle, and more particularly, to a radial tire which improves the steering stability on a dry road (hereinafter referred to as dry performance), wear resistance and the wet performance.

Heretofore, with a view to improving the durability of the belt portion and to reducing the rolling resistance, radial tires have been proposed in which the carcass line is defined by an "equilibrium carcass line".

This equilibrium carcass line means a natural equilibrium configuration of a carcass layer formed as a result of the balance between the normal internal pressure of a tire and a reaction force generated in an area where the carcass layer and a belt layer overlap with each other and the tension of the carcass layer in a condition wherein no substantial force other than the normal internal pressure and the reaction force acts on the tire when the tire is inflated up to its normal internal pressure.

For instance, British patent specification No. GB 2,006,695B proposes the improvement of the durability by providing the equilibrium carcass line such that a natural equilibrium configuration formed when no substantial force other than the internal pressure of the tire acts thereon is exhibited in an area extending from the maximum width position of the carcass layer toward the bead portion when the tire is inflated, and that a theoretical equilibrium configuration formed when no substantial force other than the internal pressure and the reaction force of the belt layer acts thereon is exhibited in the remaining area extending from the maximum width position toward the tread. In addition, the specification of U.S. Pat. No. 4,513,802 proposes the reduction of the rolling resistance by increasing the height of the sidewall of the maximum width position of a tire.

However, in each of these proposals, it is intended to control the distribution of tension of carcass cords, and it is not intended to control the distribution of tension of belt cords, which the present invention proposes to control as hereinafter described. Therefore, the belt tension generated when radial tires proposed in the above cited Patent specifications were inflated up to their normal internal pressures becomes greater at the ground-contacting central portion of the tread portion, but sharply decreases toward the shoulder side end portions, and the apparent rigidity decreases. Because of this, it was not possible to improve the steering stability while driving to turn. Furthermore, the width of grooves in the tread portion is reduced by the side force generated while driving to turn, and therefore it was not possible to avoid the deterioration of the wet performance.

In a radial tire, when trying to improve the wet performance, it is common that the ratio of groove area to the total ground-contacting area of the tread portion is made greater. However, if the groove area ratio is increased, the actual ground-contacting area of the tread portion decreases, and therefore the deterioration of the dry performance and wear resistance is inevitable.

SUMMARY OF THE INVENTION

An object of the present invention is to provide a pneumatic radial tire for a passenger vehicle that greatly improves the wet performance together with the dry performance and wear resistance.

In a radial tire according to the present invention that can fulfill the above object, at least a portion of a carcass line extending radially outwardly from the maximum width position in a carcass line of a tire fitted to a normal rim and inflated up to its normal internal pressure is required to substantially conform to an equilibrium carcass line represented by the following equations (1) and (2) calculated by using an internal pressure allotment ratio, $g(y)$, of the carcass layer in the tread portion that is obtained by setting the distributional configuration index $\alpha$ in the following equation (3) at 4 or more, and to determine the width of the belt layer extending radially outwardly of the tire so as to range from 105 to 120% of the ground-contacting width of the tread portion when loaded with a designed normal load.

in $y_D \leq y \leq y_A$, $$r_1 = \frac{\int_{y_D}^{y_A} g(y) \cdot y \, dy + (y_D^2 - y_C^2)/2}{g(y) \cdot y} \quad (1)$$

in $y_B \leq y \leq y_D$, $$r_1 = \frac{\int_{y_D}^{y_A} g(y) \cdot y \, dy + (y_D^2 - y_C^2)/2}{y} \quad (2)$$

$$g(y) = \frac{1 - \eta}{(y_D - y_A)^\alpha} (y - y_A)^\alpha + \eta \quad (3)$$

wherein, provided that a line drawn vertically downwardly from the center of the tread portion to the axle of the tire is y axis of coordinates with the axle of the tire being z axis of coordinates, $y_A$, $y_D$, $y_C$, $y_B$ and $\eta$ denote as follows:

$y_A$: y axis of coordinates for the carcass line at the center of the tread portion;

$y_D$: y axis of coordinates for the carcass line at the effective width end portion of the belt layer;

$y_C$: y axis of coordinates for the carcass line at the maximum width position in a tire carcass line;

$y_B$: y axis of coordinates for the carcass line at the bead portion; and $\eta$: the internal pressure allotment ratio of the carcass layer at the center of the tread portion.

When used in relation to the tire according to the present invention, a normal rim and a normal internal pressure mean those defined in accordance with the types of tires in the standard of Japan Automobile Tire Manufacturers' Association (JATMA).

In addition, in the tire of the present invention, the ground-contacting width of the tread surface of the tire means a widthwise ground-contacting distance of the tire when loaded with a designed normal load in a state in which it is fitted to a normal rim defined in the standard of the above JATMA and is inflated up to its normal internal pressure.

Furthermore, a carcass line means a curved configuration formed by a center line of a carcass layer in a cross-section of the tire cut in the direction of the meridian line thereof.

DETAILED DESCRIPTION OF THE PREFERRED EMBODIMENTS

Figure 1:
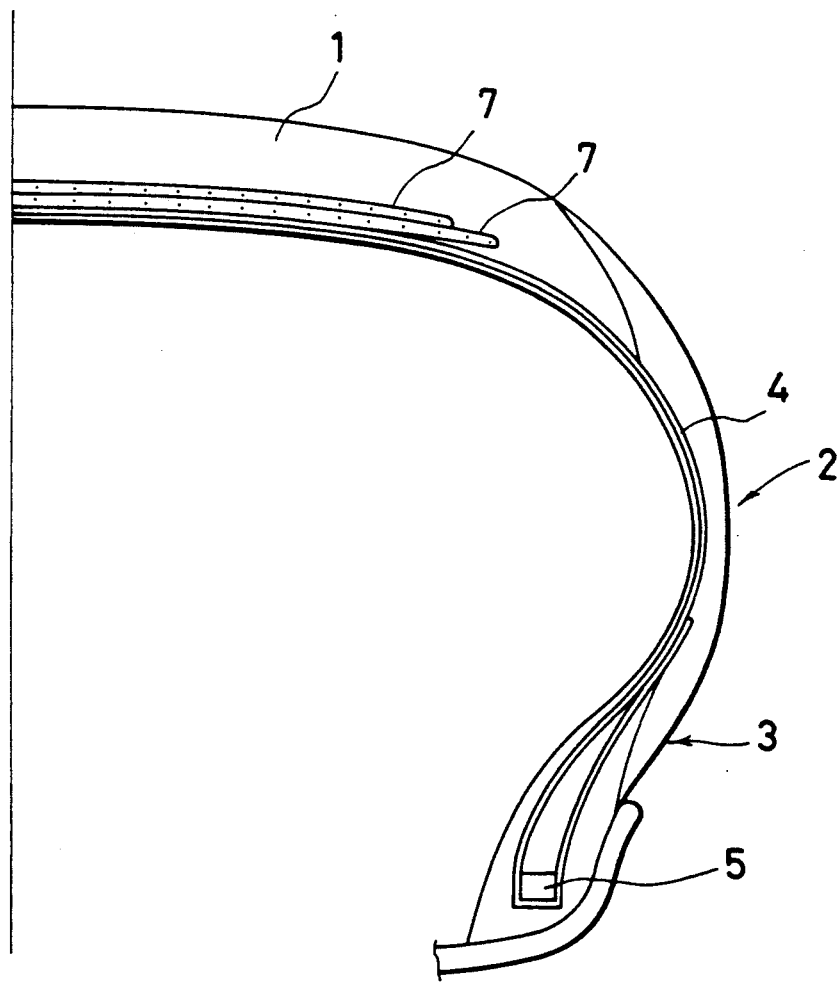
FIG. 1 is a half-cut cross-sectional view showing an example of a tire according to the present invention.

FIG. 1 shows an example of a radial tire according to the present invention, and it comprises a pair of left and right bead portions 3, a pair of left and right sidewall portions 2 that continuously extend from the bead portions 3, respectively, and a tread portion 1 continuously extending to the respective sidewall portions 2. The ends of a carcass layer 4 are folded over around bead cores 5 of the bead portions 3 from the inside of the tire to the outside thereof, and two belt layers 7 extending in the circumferential direction of the tire are provided at the tread portion 1 of this carcass layer 4.

For a tire for a passenger vehicle, organic fibers such as of nylon, rayon and polyester are commonly used for carcass cords constituting the carcass layer, and cords having a high elastic modulus such as steel cords and aramid fiber cords are used as belt cords constituting the belt layer 7. When required, a belt cover layer having a cord angle of 0° with respect to the circumferential direction of the tire and comprising nylon cords may be disposed on the surface of the belt layer 7.

There are many known theoretical equations for calculating an equilibrium carcass line, and in the present invention, the equilibrium carcass line is defined by using the aforementioned equations (1), (2) and (3) developed by F. Bohm that are most frequently used of those known equations. The details of these theoretical equations are described in ATZ 69 (1967), "Zur Statik und Dynamik des Gurlelreifens".

In the theoretical equations of F. Bohm, it is understood that the internal pressure is alloted and borne by two layers, a belt layer and a carcass layer in the tread portion, and provided that the allotment ratio borne by the carcass layer is g(y), since the internal pressure borne by the carcass layer is P·g(y) with the internal pressure borne by the belt layer being P·[1−g(y)], the internal pressure P is expressed by:

$$P = [p \cdot g(y)] + [P \cdot (1 - g(y))] \quad (4)$$

The g(y) is a function representing the internal pressure allotment ratio of the carcass layer extending from the center of the tread portion toward the side (shoulder) portions and is expressed by the equation (3) above.

In a case where the internal pressure allotment at the tread portion borne by the belt and carcass layers is expressed by the above equation (4), the configuration of the equilibrium carcass line at the tread portion is a continuity of arcs having radius curvatures $r_1$ expressed by the above equations (1) and (2).

Figure 2:
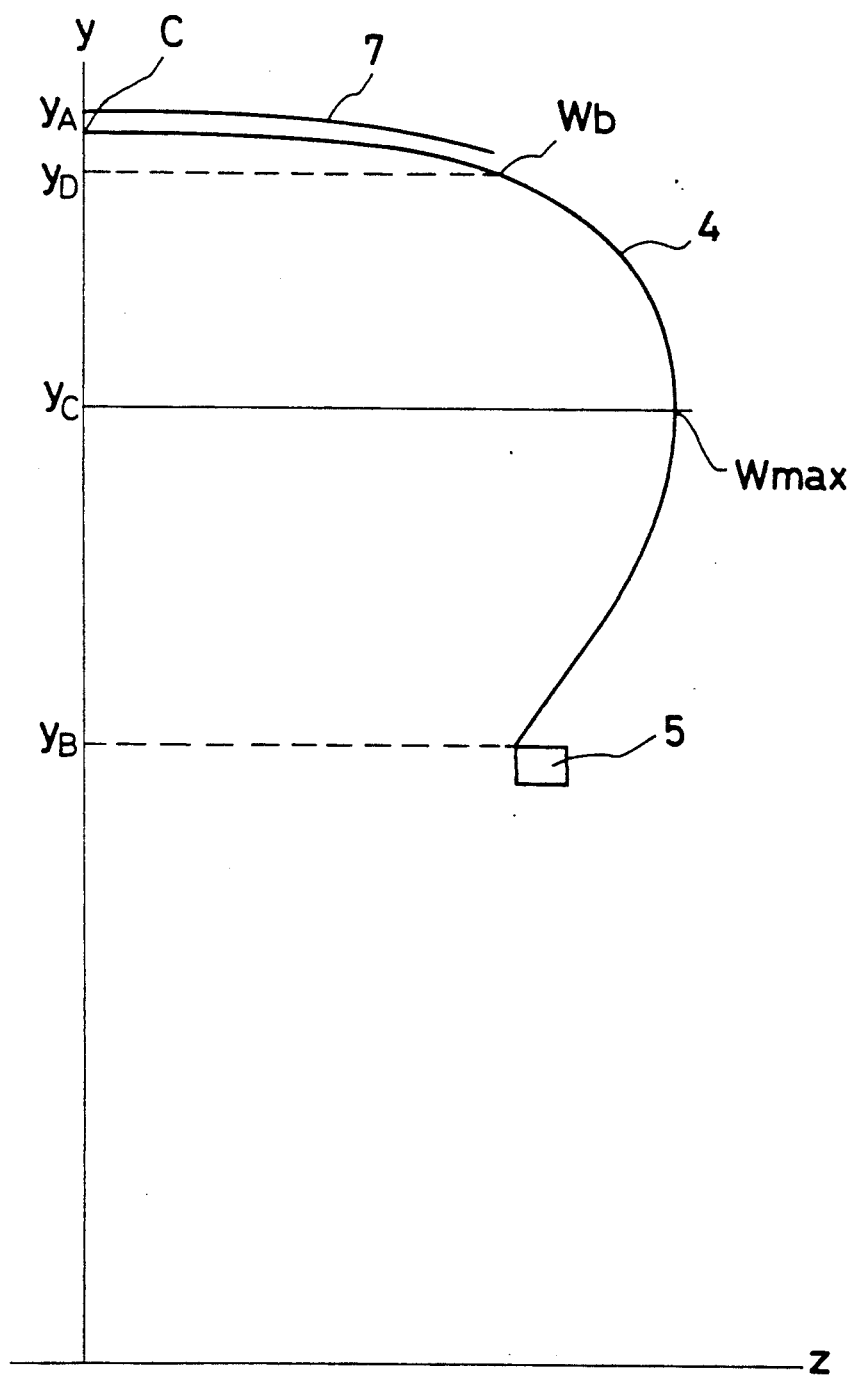
FIG. 2 is a view showing the equilibrium carcass line of the tire according to the present invention in the form of coordinates.

In these equations (1) and (2), as shown in FIG. 2, provided that a line drawn down to the axle of the tire from the center C of the tread portion is y axis of coordinates with the axle of the tire being z axis of coordinates, $y_A$ denotes y axis of coordinates for the carcass line at the center C of the tread portion, $y_D$ denoting y axis of coordinates for the carcass line at the end portion Wb of the effective belt width, $y_C$ denoting y axis of coordinates for the carcass line at the maximum width position in a tire carcass line Wmax, $y_B$ denoting y axis of coordinates for the carcass line at the bead portion, and $\eta$ denoting the internal pressure allotment ratio of the carcass layer at the center C of the tread portion.

Therefore, the equilibrium carcass line based on the equations of (1) and (2) can be directly determined by determining the g(y) of the equation (3).

It is common heretofore to use as the g(y) of a conventional tire a quadratic function in which the distributional configuration index $\alpha$ in the equation (3) is 2 from a calculation result based on the finite element method and experimental results. In contrast, in the present invention, a function of higher order is used in which the distributional configuration index $\alpha$ in the equation (3) is 4 or more, preferably 4 to 8. As is clear from the equations (3) and (4), since it is possible to increase the internal pressure allotment ratio even at the side portion compared with the case where the conventional quadratic function in which $\alpha$ is 2 is used by making in $\alpha$ 4 or more as described above, whereby the reduction of the belt tension at the shoulder portions is made small. Therefore, the belt tension and the apparent rigidity at the shoulder portions can be made greater than those of conventional tires.

Figure 3:
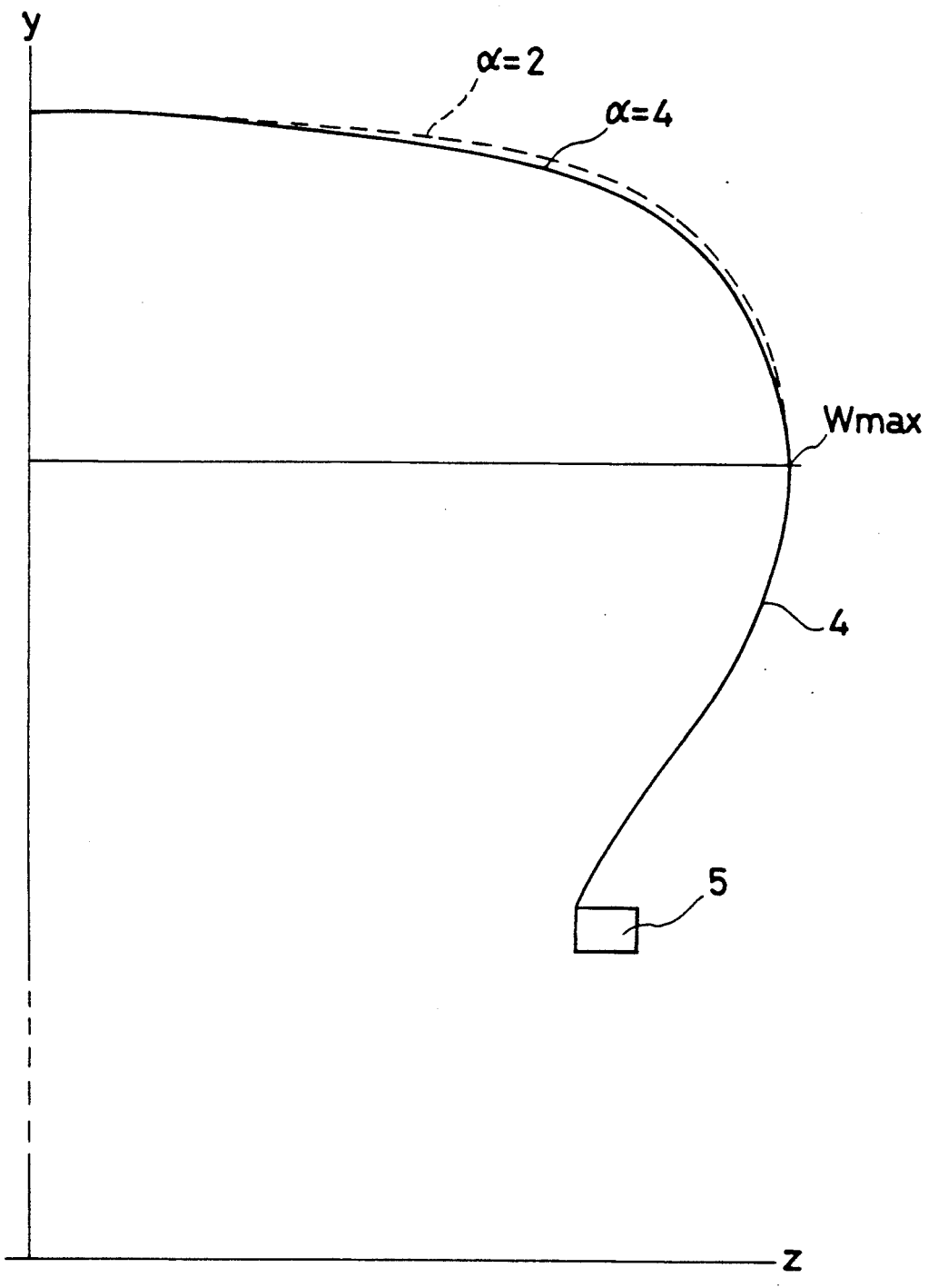
FIG. 3 is a half-cut cross-sectional view showing comparatively examples of the equilibrium carcass line configurations of the tire according to the present invention and a conventional tire.

FIG. 3 shows a continuity comprising arcs made based on the radius of curvatures calculated from the above equations (1) and (2), i.e., the configuration of the equilibrium carcass line. The solid line shows the carcass line of the tire of the present invention in which $\alpha$ is 4, while the dotted line shows the carcass line of the conventional tire in which $\alpha$ is 2. It will be seen when comparing the two carcass lines of the tire of the present invention and the conventional tire in FIG. 3 that the radius of curvature of the former gradually decreases toward the shoulder portion.

Thus, in the configuration of the equilibrium carcass line of the tire according to the present invention, since the belt tension in the shoulder portions can be increased, thereby making it possible also to increase the apparent rigidity of the belt layer, the dry performance (steering stability) when driving on a corner can be improved.

Furthermore, in the tire according to the present invention, the width of the belt layer extending radially outwardly of the tire is made to range from 105 to 120% of the ground-contacting width of the tread portion when the tire is loaded with a designed normal load. In a conventional tire, the width of the belt layer extending radially outwardly of the tire is not more than 100% of the ground-contacting width of the tread portion when the tire is loaded with a designed normal load. However, the width of the belt layer of the relevant portion of the tire of the present invention is made to range from 105 to 120%, and making full use of the aforementioned tendency of the belt tension in which the apparent rigidity of the shoulder portions greatly increases, the apparent rigidity of the shoulder portions is made to further increase. Thus, it is possible to improve the dry performance when driving to turn and the wear resistance of the shoulder portions by remarkably increasing the apparent rigidity of the shoulder portions. On top of this, since the reduction and variation of the width of grooves at the shoulder portions can be prevented, the wet performance can also be remarkably improved.

The tire of the present invention as described above is manufactured through the following procedure.

First, an equilibrium carcass line is obtained by calculating radius of curvature $r_1$ from the equations (3), and (1) and (2) with the distributional configuration index $\alpha$ of the carcass internal pressure allotment ratio being set at 4 or more. Then, the configuration of a carcass line is set such that the equilibrium carcass line so obtained conforms to the configuration of the portions extending radially outwardly from the maximum width position in the tire carcass line, and a predetermined padding is applied thereto, thereby determining the configuration of a mold. Following this, a tire mold having this mold configuration is made. A green tire having a targeted structure and a belt layer with a specified width is made, and molding and vulcanization are carried out using the above tire mold.

A mold conforming to the carcass line of the tire of the present invention is prepared by applying plaster on the circumference of the tire after inflating the tire up to its normal internal pressure, and leaving the same in its inflated state so that the tire configuration is stabilized. The carcass line of the tire generated when the tire is inflated can be specified by cutting the tire in the radial direction and by drawing the cross-sectional configuration of the tire in such a manner as to let the external configuration of the tire follow a mold which is prepared as described above.

As described above, according to the present invention, since a portion of the carcass line extending radially outwardly from the maximum width position in the carcass line of the tire fitted to a normal rim and inflated up to its normal internal pressure is configured so as to substantially conform to the equilibrium carcass line expressed by the afore-mentioned equations (1) and (2) calculated using the internal pressure allotment ratio, $g(y)$, of the carcass layer in the tread portion that is obtained by setting the distributional configuration index $\alpha$ of the equation (3) at 4 or more, it is possible to increase the belt tension at the shoulder portions, thereby making it possible to increase the apparent rigidity of the belt layer. Further, since the width of the belt of the tire extending radially outwardly of the tire is made to range from 105 to 120% of the ground-contacting width of the tread portion when the tire is loaded with a designed load, thereby making it possible to further increase the belt tension of the shoulder portions, the dry performance (steering stability) when driving on a corner can be remarkably improved, and since the reduction of the width of grooves at the shoulder portions is also made small, not only a good wear resistance can be ensured but also the wet performance can be remarkably improved.

Referring to an example, the present invention will be described more concretely.

The following four types of radial tires were prepared, which had a same tire size of 195/65 R 15.

Tire of the Present Invention:

The belt layers, carcass layer, carcass configuration and width (belt width) of the belt layer extending radially outwardly of the tire are as follows.

Belt Layer:

Steel cords of 1×5 (0.25) were bias-laminated at an angle of 24° to the circumferential direction of the tire with an end count of 40 per 50 mm.

Belt Width:

The belt width was made 110% of the ground-contacting width of the tread surface when the tires were fitted to a rim of 15×5½ JJ, were filled with air under an air pressure of 1.9 kg/cm² and were loaded with a load of 505 kg.

Carcass Layer:

Polyester fiber cords of 1000 D/2 were disposed at an angle of 90° to the circumferential direction of the tire with an end count of 55 per 50 mm.

Carcass Line Configuration:

At least a portion of the carcass line extending radially outwardly from the maximum width position in the carcass line of the tire fitted to a normal rim and inflated to its normal internal pressure was configured so as to conform to the equilibrium carcass line calculated from the equations (3), (1) and (2) with the distributional configuration index $\alpha$ of the carcass internal pressure allotment ratio $g(y)$ being set at 4.

Conventional Tire I:

This tire had the same construction as that of the tire of the present invention except that the carcass line configuration and the belt width were changed as follows.

Carcass Line Configuration:

At least a portion of the carcass line extending radially outwardly from the maximum width position in the carcass line of the tire fitted to a normal rim and inflated to its normal internal pressure was configured so as to conform to the equilibrium carcass line calculated from the equations (3), (1) and (2) with the distribution configuration index $\alpha$ of the carcass internal pressure allotment ratio $g(y)$ being set at 2.

Belt Width:

The belt width was made 100% of the ground-contacting width of the tread surface of the tire that was measured under the same condition as the one in which the tire of the present invention was measured.

Conventional Tire II:

This tire had the same construction as that of the tire of the present invention except that the carcass line configuration was changed as follows.

Carcass Line Configuration:

At least a portion of the carcass line extending radially outwardly from the maximum width position of the tire fitted to a normal rim and inflated to its normal internal pressure was configured so as to conform to the equilibrium carcass line calculated from the equations (2), (1) and (2) with the distributional configuration index $\alpha$ of the carcass internal pressure allotment ratio $g(y)$ being set at 2.

Comparison Tire:

This tire had the same constructions as that of the tire of the present invention except that the belt width was changed as follows.

Belt Width:

The belt width was made 100% of the grouncontacting width of the tread surface of the tire that was measured under the same condition as the one in which the tire of the present invention was measured.

Using the following measuring methods, the four types of tires were rated in terms of the condition in which hydroplaning was generated, and the cornering power as dry performance.

Hydroplaning Test:

The test tires were fitted to rims of 15×5½ JJ, and were filled with air under an air pressure of 1.9 kg/cm². Then, these tires were fitted to domestic automobiles having a front-engine rear-drive layout, and the automobiles were driven at a certain speed on a circular course with a radius of 100 m having a 10 m long wet area with a water depth of 5 mm, and the speed at which the lateral acceleration G became maximum while passing through the wet area was measured.

Cornering Power:

The test tires were fitted to rims of 15×5½ JJ, and were filled with air under an air pressure of 1.9 kg/cm². Using a flat belt type cornering test machine made by MTS Corporation, a cornering power when loaded with a load of 505 kg (replaced with a cornering force when the slip angle is 1) was measured.

The above measured results were shown in the form of index, taking the measured values of the Conventional Tire I as 100 in each test. Greater indexes show better dry and wet performances.

|  | Width of Belt Layer | α | Dry Performance | Wet Performance |
|---|---|---|---|---|
| Tire of Present Invention | 110 | 4 | 108 | 135 |
| Conventional Tire I | 100 | 2 | 100 | 100 |
| Conventional Tire II | 110 | 2 | 104 | 115 |
| Comparison Tire | 100 | 4 | 102 | 110 |

As will be seen from the table above, the cornering power of the tire of the present invention is greater than those of the Conventional Tires I and II and the Comparison Tire, and is superior to those tires in the dry performance. In addition, the wet performance of the tire of the present invention is remarkably improved.

What is claimed is:

1. A pneumatic radial tire for a passenger vehicle, wherein the improvement comprises: a radial tire having a carcass, a tread portion, a belt layer underlying the tread portion, at least a portion of a carcass line extending radially outwardly from the maximum width position in the carcass line of the tire fitted to a normal rim and inflated up to its normal internal pressure is configured so as to substantially conform to an equilibrium carcass line expressed by the following equations (1) and (2) calculated by using an internal pressure allotment g(y) of a carcass layer at the tread portion that is obtained by setting the distributional configuration index α of the following equation (3) at 4 or more, and that the width of the belt layer extending radially outwardly of the tire is from 105 to 120% of the ground-contacting width of said tread portion when loaded with a designed normal load, wherein:

In $y_D \leq y \leq y_A$ $$r_1 = \frac{\int_{y_D}^{y_A} g(y) \cdot y \, dy + (y_D^2 - y_C^2)/2}{g(y) \cdot y} \quad (1)$$

In $y_B \leq y \leq y_D$ $$r_1 = \frac{\int_{y_D}^{y_A} g(y) \cdot y \, dy + (y_D^2 - y_C^2)/2}{y} \quad (2)$$

$$g(y) = \frac{1 - \eta}{(y_D - y_A)} (y - y_A)^\alpha + \eta \quad (3)$$

wherein, provided that a line drawn vertically downwardly from the center of the tread portion to an axle of the tire is y axis of coordinates with the axle of the tire being z axis of coordinates, $y_A$, $y_D$, $y_B$, and $\eta$ denote as follows:

$y_A$: y axis of coordinates for the carcass line at the center of the tread portion;

$y_D$: y axis of coordinates for the carcass line at the effective width end portion of the belt layer;

$y_C$: y axis of coordinates for the carcass line at the maximum width position in a tire carcass line;

$y_B$: y axis of coordinates for the carcass line at the bead portion; and $\eta$: the internal pressure allotment ratio of the carcass layer at the center of the tread portion.

2. A pneumatic radial tire as set forth in claim 1, wherein said distributional configuration index α is set to 4 to 8.

3. A pneumatic radial tire as set forth in claim 1, wherein carcass cords constituting said carcass layer are organic fiber cords.

4. A pneumatic radial tire as set forth in claim 3, wherein said organic fiber cords are selected from the group consisting of nylon cords, rayon cords and polyester cords.

* * * * *